United States Patent [19]

Hinterkeuser et al.

[11] 4,194,872
[45] Mar. 25, 1980

[54] APPARATUS FOR THE COOLING, CALIBRATING AND STRAIGHTENING OF A PLATE-SHAPED CONTINUOUSLY EXTRUDED SYNTHETIC-RESIN STRAND

[75] Inventors: Wilhelm Hinterkeuser, St. Augustin-Menden; Norbert Herres, Hennef-Allner; Paul Reitemeyer, Troisdorf-Bergheim, all of Fed. Rep. of Germany

[73] Assignee: Reifenhäuser KG, Troisdorf, Fed. Rep. of Germany

[21] Appl. No.: 830,334

[22] Filed: Sep. 2, 1977

[30] Foreign Application Priority Data

Sep. 4, 1976 [DE] Fed. Rep. of Germany ....... 2639910

[51] Int. Cl.² .................... B29C 24/00; B29D 7/10
[52] U.S. Cl. .................... 425/72 R; 425/327; 425/335; 425/363; 425/404
[58] Field of Search ............ 72/206, 210, 256, 211, 72/214; 425/327, 335, 363, 384, 385, 71, 72 R, 394, 383, DIG. 235, 404; 264/310, 284, 293

[56] References Cited

U.S. PATENT DOCUMENTS

| 3,116,787 | 1/1964 | Campbell | 425/404 X |
|---|---|---|---|
| 3,250,834 | 5/1966 | Collins | 425/327 X |
| 3,555,601 | 1/1971 | Price | 425/327 |
| 3,570,294 | 3/1971 | Shibata | 72/214 X |
| 3,593,676 | 7/1971 | Reid et al. | 425/335 |

FOREIGN PATENT DOCUMENTS 6701289  4/1967  Netherlands ...................... 425/327

*Primary Examiner*—Mark Rosenbaum
*Attorney, Agent, or Firm*—Karl F. Ross

[57] ABSTRACT

An apparatus for the cooling, straightening and calibration of a plate-shaped synthetic-resin strand, e.g. of thermoplastic material extruded from a broad-slot nozzle comprises a plurality of straightening rollers on respective stands, the rollers of each stand engaging opposite surfaces of the strand. The rollers are provided with cooling and heating means to ensure homogeneous temperature distribution throughout the strand passing between the pairs of rollers which can be aligned with one another or can be offset from one another. On at least one of the stands the rollers are displaceable alternately parallel to the path of the strand by corresponding oscillating drive.

10 Claims, 5 Drawing Figures

APPARATUS FOR THE COOLING, CALIBRATING AND STRAIGHTENING OF A PLATE-SHAPED CONTINUOUSLY EXTRUDED SYNTHETIC-RESIN STRAND

FIELD OF THE INVENTION

The present invention relates to an apparatus for the cooling, calibration and straightening of a plate-shaped synthetic-resin strand. More particularly, the invention relates to the processing of extruded flat strands of thermoplastic synthetic-resin material, e.g. of the type emerging from a broad-slot nozzle of an extruder head.

BACKGROUND OF THE INVENTION

It has already been proposed heretofore to provide, in association with extruder means for producing a relatively long flat (plate-shaped) synthetic-resin strand, a roller assembly comprising a plurality of pressing rollers in a roller stand through which the strand passes. The roller stand is generally stationary and the pressing or calibrating rollers are neither heated or cooled. As a result, the synthetic-resin strand undergoes warping, bulging and like deformation upon cooling or subsequent to cooling, this being especially the case when relatively thick and broad plates are to be produced, i.e. when the strand is relatively thick and wide.

OBJECTS OF THE INVENTION

It is the principal object of the present invention to provide an apparatus for the cooling, calibration and straightening of a plate-shaped synthetic-resin strand which is capable of ensuring temperature homogenization thereof and hence minimizes the warping or bulging to which the plates formed from the strand may be subject.

Another object of the invention is to provide an apparatus for the purposes described which is capable of producing synthetic-resin strands with minimal thickness variations and substantially complete freedom from distortion.

It is yet another object of the invention to provide an apparatus for the cooling, calibration and straightening of relatively wide and thick extruded synthetic-resin strands.

SUMMARY OF THE INVENTION

These objects and others which will become apparent hereinafter, are attained, in accordance with the present invention, in an apparatus for the cooling, calibration and straightening or a relatively broad and thick extruded thermoplastic synthetic-resin strand which comprises a set of rollers including rollers engaging opposite faces of the strand, between which the strand passes. According to the present invention, the individual press rollers have integrated therewith cooling and/or heating means such that the rollers are either cooled and/or heated to ensure a homogeneous temperature distribution over the surfaces of the rollers and within the strand engaged thereby.

Another essential feature of the invention resides in the fact that at least some of the rollers in engagement with the strand are shiftable back and forth parallel to the direction of advance thereof by a corresponding oscillating drive.

In a preferred embodiment of the invention, the spacing of nearest rollers of the set or assembly from each other is adjustable in the direction of advance of the strand through the assembly.

The pressing rollers of the present invention can be rotated by entrainment by the strand, i.e. can be entrained rollers, or can be driven. In the latter case, the rollers can be provided with controllable rotation drives individually or collectively.

When a highly intense cooling is to be effected, it has been found to be advantageous between neighboring pressing rollers to provide nozzles for directing a coolant onto the rollers or directly onto the strand between the rollers.

The apparatus has the advantage that a relatively thick and broad synthetic-resin strand can be treated easily and simply such that only minimum thickness tolerances will result or can be maintained and that the strand and the plates formed therefrom are completely free from any tendency to warp, bulge or otherwise distort because of internal stresses. The strands can have a thickness of 60 mm and more without difficulty.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
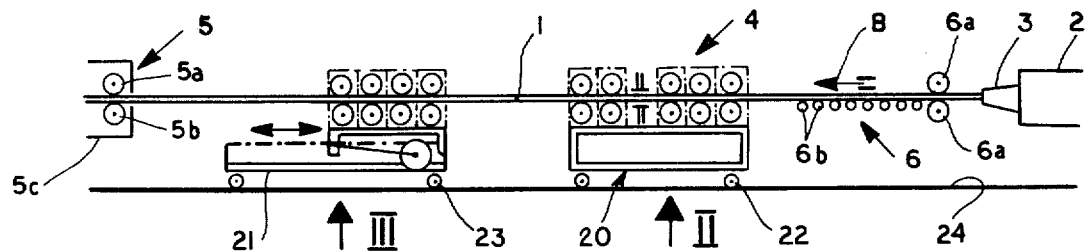
FIG. 1 is a side-elevational view of an apparatus for the calibration and straightening of a plate-shaped synthetic-resin strand in accordance with the present invention, the parts of the apparatus being shown diagrammatically.

In the foregoing discussion and the description below, reference has been made to the calibration of plate-shaped synthetic-resin strands which emerge continuously from an extrusion press through, for example, a broad-slot nozzle or extrusion head (die). The term "calibration" is here used to refer to the establishment of a predetermined thickness of the strand.

The apparatus illustrated in the drawing for the calibration and straightening of a plate-shaped synthetic-resin strand 1 comprises an extrusion press 2 provided with a broad-slot nozzle, head or die 3 from which the plate-shaped thermoplastic strand 1 emerges in a plastically deformable state.

Downstream of the extruder 2, there is provided a cooling line 4 and a drawing device 5, the latter being formed with rollers 5a and 5b which engage opposite sides of the strand and draw the same in the direction of arrow B. The rollers 5a and 5b can be provided at the upstream end of a tunnel 5c in which the strand is cooled to room temperature and in which the strand can be cut to predetermined lengths to form slabs or plates.

Between the extrusion press 2 and the cooling path 4, there is provided a conveyor 6 which can be of the roller type, i.e. can be provided with a pair of upstream calibration rollers 6a establishing the initial thickness of the strand, and a roller table 6b upon which the strand is supported. In the region of the conveyor 6 the strand need not be self-supporting.

It should be noted further that the invention is not limited to apparatus in which the synthetic-resin strand 1 is displaced only horizontally. It is possible, therefore, to provide for a vertical withdrawal of the synthetic-resin strand 1 from the extruder head or die 3.

In any case, the synthetic-resin strand 1 should initially undergo tempering, i.e. controlled heat loss or heat gain, to ensure cooling of the strand with complete temperature homogenization throughout the latter.

In the system of the present invention, the cooling path 4 is provided with a plurality of stands 20, 21 which can be mounted on wheels 22, 23 to roll upon a floor or track 24 and permit the spacing of the stands 20 and 21 to be adjusted as required. Once the stands are positioned for a particular strand thickness and width, they can be held in place by locking devices not shown.

Each of the stands comprises an assembly of pressing rollers 7 which are integrated with cooling means and-/or heating means to ensure tempering of the strand contacting the rollers to homogeneous temperature conditions. The pressing rollers are pressed against the strand from opposite sides as represented by the arrows 8.

Figure 2:
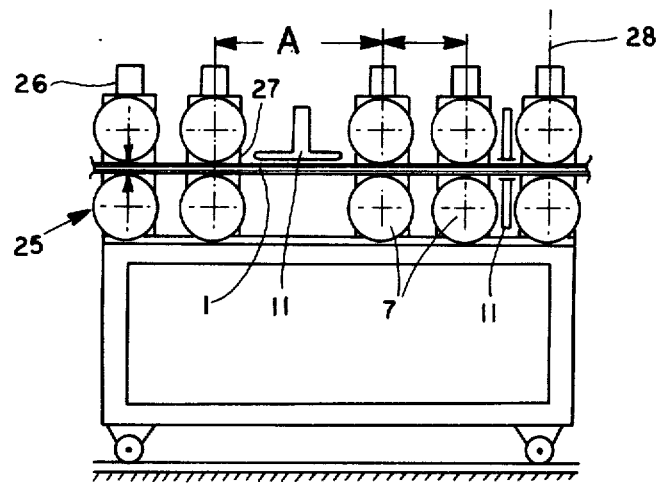
FIG. 2 is a detail-elevational view of a roller stand in the region II of FIG. 1, drawn to an enlarged scale but also illustrated diagrammatically.

In the stand 20 illustrated in greater detail in FIG. 2, the rollers 7 are disposed in pairs 25 which can be relatively adjusted with respect to one another by spindle assemblies 26 to vary the spacing s between the rollers of each pair. In this embodiment, the rollers are mounted in journal blocks 27 and can be either driven or entrained by the strand. In the roller stand 20, moreover, the rollers 7 are disposed directly opposite one another, i.e. the axes of the rollers of each pair lie in a respective vertical plane 28 perpendicular to the strand 1 and the direction of feed B thereof. A similar construction of the rollers 7 can be found in the roller stand 21 shown in FIG. 3.

Figure 4:
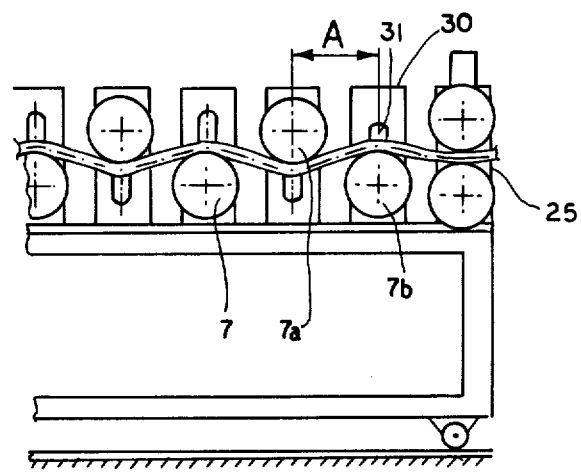
FIG. 4 is another view similar to FIGS. 2 and 3 but showing a further embodiment.

However, as can be seen from FIG. 4, it is possible to modify the roller assemblies of each of these roller stands. For example, the initial pair of rollers 7 can be a pair 25 as previously described while the rollers downstream thereof are staggered horizontally and vertically to engage opposite faces of the strand in a zigzag or alternating manner. Each of the rollers 7 downstream of the pair 25, therefore, can be mounted between a pair of journal blocks 30 which have slots 31 within which the axes for shafts of these rollers can be vertically shifted.

The spacing A between pairs 25 of rollers 7 or between the individual rollers 7a and 7b of the assembly of FIG. 4, is adjustable in accordance with the present invention for different operating conditions, strand speeds and strand dimensions.

Downstream of the first stand 20, which can be fixed for a given cooling operation, the stand 21 is provided with means enabling reciprocation of its set of rollers 7 in a direction 10 parallel to the direction of advance of the strand 1. To this end, the rollers 7 are mounted upon a carriage 31 which is horizontally shiftable upon rails 32 of the stand 21, the carriage 31 being engaged by an arm 33 connected to a crank 34 of an oscillating drive 9 carried by the stand 21. The rollers 7 are here preferably entrained rollers when the carriage 31 is reciprocatable as described.

Between pairs of the rollers 7 or between the individual rollers thereof, air nozzles 11 can be provided to direct respective streams of air against the strand 1 and thereby further control the cooling operation.

With the apparatus described, it has been found to be possible to calibrate, cool and straighten relatively thick and wide synthetic-resin strands, which can be subsequently cut into thick slabs or plates, without the danger that the slabs or plates will warp or bulge because of internal stresses.

Figure 3:
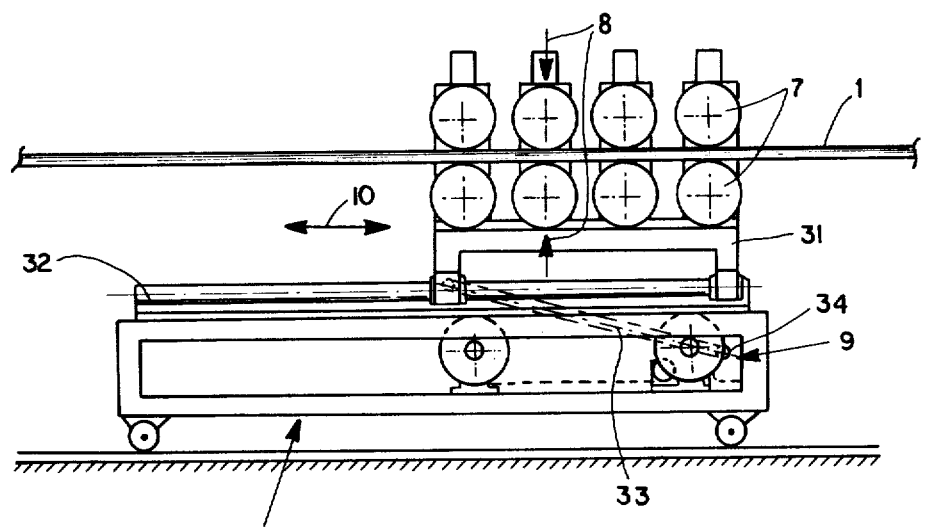
FIG. 3 is a view similar to FIG. 2 but showing the reciprocating-roller assembly III of FIG. 1.

The oscillating movement of the rollers 7 shown in FIG. 3 has been found to give rise to an especially uniform thickness of the strand, even with extremely wide and thick plates, thereby minimizing the thickness tolerances and eliminating warping and bulging. A good surface finish is also applied to this strand and the plates produced therefrom.

Figure 5:
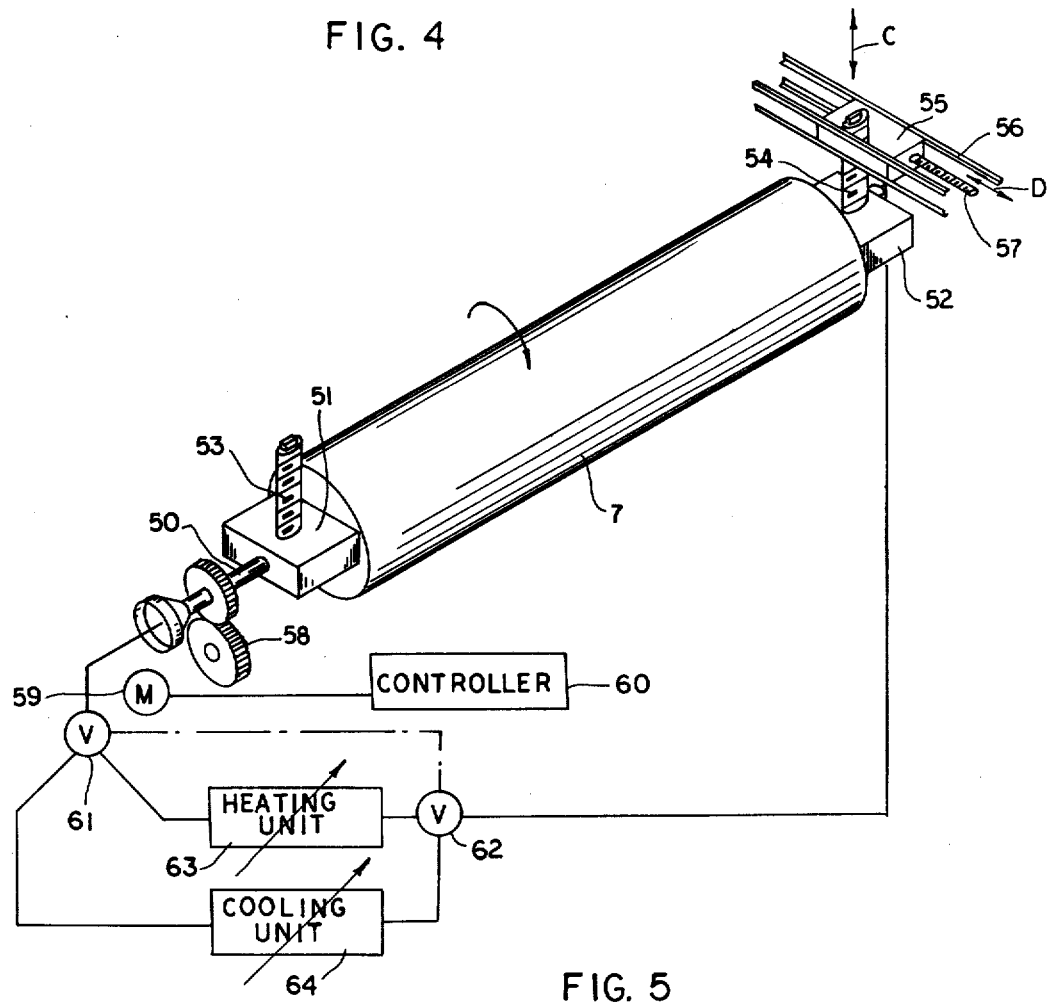
FIG. 5 is a diagrammatic detail view illustrating aspects of the invention.

In FIG. 5, I have shown various elements of the apparatus for a single roller 7 which are nevertheless applicable to all of the rollers in each of the stands described previously. For instance, the roller 7 may be provided with a tubular shaft 50 which can communicate with the interior of the roller which may be hollow so as to enable the roller 7 to be traversed by a heating or cooling stream. The shaft 50 is journaled in a path of bearing blocks 51 and 52 which can be vertically displaced by threaded spindles 53 and 54 in respective support blocks, one of which is shown at 55 and which are internally threaded. Thus the roller 7 can be displaced vertically (arrow C) relative to a support 56 for the rollers on each side of the strand.

Support 56 may be constituted as a rail assembly in which the internally threaded blocks 55 are horizontally displaceable (arrow D) by any conventional adjustment means for establishing the spacing A. Such means has been diagrammatically represented in FIG. 5 as the spindle 57.

The spindle 57 can form part of a turnbuckle assembly connecting the blocks 55 of adjacent or nearest-neighbor roller 7 on each side of the strand 1.

The shaft 50 can also be connected, e.g. via gearing 58 to a synchro motor 59, the motors of all of the rollers being energized through a conventional synchro controller 60 to drive the rollers at the desired adjustable speed if the rollers 7 are not to be of the entrained-rotation type.

The apparatus of the present invention can also include valves 61 and 62 for selectively feeding a heating fluid from a variable-temperature heating unit 63 or a coolant from a variable-temperature cooling unit 64 through the roller 7 thereby controlling the temperature of each roller so that the same can act as an integrated heating or cooling element in accordance with the principles enunciated above.

We claim:

1. An apparatus for the continuous cooling, calibration and straightening of a plate-shaped synthetic-resin strand, comprising, in combination with an extruder for continuously producing said strand, and means spaced from said extruder defining a path for the produced strand;

guide means along said path downstream of said extruder;

at least one roll stand reciprocatingly shiftable on said guide means downstream of said extruder, said roll stand being provided with a multiplicity of pressing rollers flanking said strand and in contact with opposite faces thereof, said multiplicity of rollers including rollers spaced apart along said strand on opposite sides thereof, said means defining said path including means downstream of said rollers for displacing said strand unidirectionally and continuously along said path through said roll stand; and an oscillating drive for reciprocatingly shifting at least some of said rollers back and forth along said strand parallel to the direction of displacement thereof during the continuous unidirectional advance of said strand in said direction along said path.

2. The apparatus defined in claim 1, further comprising means for adjusting the spacing of said rollers along said strand in the direction of displacement thereof.

3. The apparatus defined in claim 2 wherein said rollers are rotated by entrainment with said strand.

4. The apparatus defined in claim 2, further comprising means for controlledly rotating said rollers.

5. The apparatus defined in claim 2, further comprising nozzle means between rollers of said stand for contacting said strand with a cooling fluid.

6. The apparatus defined in claim 1 wherein at least two such stands downstream of said extruder, both said stands being shiftable along the path of said strand.

7. The apparatus defined in claim 6 wherein said rollers are disposed in pairs directly opposite one another and flanking said strand, said apparatus further comprising means for adjusting the relative spacing of the rollers of each pair and means for adjusting the spacing of said pairs from one another.

8. The apparatus defined in claim 7 wherein one of said stands is formed with rolling support carrying said guide means, a carriage reciprocable on said guide means, the respective rollers of said one of said stands being mounted on said carriage, said oscillating drive including a crank mechanism for horizontally displacing said carriage.

9. The apparatus defined in claim 6 wherein at least some of said rollers of at least one of said sets are staggered horizontally and vertically and alternately engage said opposite sides of said strand in the direction of displacement thereof.

10. The apparatus defined in claim 9 further comprising means for varying the spacing of said staggered rollers from one another.

* * * * *